United States Patent [19]

Lamb et al.

[11] 4,111,888

[45] *  Sep. 5, 1978

[54] PLASTICIZED POLYMERS OF VINYL ACETATE

[75] Inventors: Frank Lamb, Oldham; Malcolm Combey, Mellor; Hugh Melvin Cooper, Cheadle, all of England

[73] Assignee: Ciba Geigy AG, Basel, Switzerland

[ * ] Notice: The portion of the term of this patent subsequent to Apr. 18, 1995, has been disclaimed.

[21] Appl. No.: 602,888

[22] Filed: Aug. 7, 1975

Related U.S. Application Data

[63] Continuation-in-part of Ser. No. 406,175, Oct. 12, 1973, abandoned, and a continuation-in-part of Ser. No. 192,625, Oct. 26, 1971, abandoned.

[51] Int. Cl.$^2$ .................... C08K 5/12; C08F 118/08
[52] U.S. Cl. .................................................. 260/31.6
[58] Field of Search .......................... 260/31.6, 475 P

[56] References Cited

U.S. PATENT DOCUMENTS

| 3,169,945 | 2/1965 | Hostettler et al. | 260/31.6 |
| 3,250,738 | 5/1966 | Isaacs et al. | 260/31.6 |
| 3,786,011 | 1/1974 | Price et al. | 260/31.6 |

FOREIGN PATENT DOCUMENTS

| 522,931 | 10/1953 | Belgium | 260/31.6 |
| 734,115 | 7/1955 | United Kingdom | 260/31.6 |

*Primary Examiner*—Allan Lieberman
*Attorney, Agent, or Firm*—Wenderoth, Lind & Ponack

[57] ABSTRACT

Polyesters derived from the reaction of a phthalic acid, with ethylene glycol, di-ethylene glycol or a polyethylene glycol and an aliphatic alcohol are used as plasticisers for vinyl acetate polymers.

6 Claims, No Drawings

PLASTICIZED POLYMERS OF VINYL ACETATE

This application is a Continuation-in-Part of co-pending application Ser. No. 406,175 filed Oct. 12, 1973 which itself is a Continuation-in-part of co-pending application Ser. No. 192,625 filed Oct. 26, 1971, now both applications being abandoned.

According to the present invention there is provided a composition comprising a vinyl acetate polymer or copolymer and from 10% to 100% by weight based on the weight of the polymer of a polyester having a molecular weight of 350 to 1500 derived from the reaction of a phthalic acid or anhydride or a mixture thereof, with ethylene glycol, di-ethylene glycol or a poly-ethylene glycol having a molecular weight up to 500, and an aliphatic alcohol containing from 2 to 11 carbon atoms. The amount of polyester is preferably from 40% to 80% by weight based on the weight of the polymer. The polyester may be obtained by reacting the acid or acid anhydride with a glycol and an alcohol. A deficiency or excess of either or both of the glycol and alcohol may be used: where there is a deficiency of glycol this may be from 0 to 10 mole% below the theoretical amount and where there is a deficiency of alcohol, this may be from 0 to 50 mole% below the theoretical amount: where there is an excess of either or both glycol and alcohol this may be up to 20 mole% in excess of the theoretical amount.

The polyester may also be obtained by ester interchange as, for example, by heating a di-alkyl ester of a di-carboxylic acid with a glycol in the presence of a catalyst.

The molecular weight of the polyester is preferably from 350 to 900.

The acid or acid anhydride used to prepare the polyester may be phthalic or isophthalic acid or the acid anhydride.

The polyethylene glycol preferably has an average molecular weight of from 175 to 225.

The alcohol is preferably one containing from 3 to 6 carbon atoms per molecule, for example, n-butyl alcohol or isobutyl alcohol. When ethylene glycol is used to prepare the polyester, the alcohol preferably has 4 carbon atoms.

Examples of plasticisers which may be used are those derived from:
(a) 4 moles phthalic anhydride, 4.4 moles of n-butanol and 2.1 moles of ethylene glycol.
(b) 4 moles phthalic anhydride, 4.4 moles of n-butanol and 2.1 moles of triethylene glycol.
(c) 4 moles phthalic anhydride, 4.4 moles of n-butanol and 2.1 moles of polyethylene glycol, having a molecular weight of 200.

The vinyl acetate polymer may be derived from the polymerisation of 100% vinyl acetate monomer or it may be a copolymer derived from the polymerisation of a mixture comprising between 55% and 100% of vinyl acetate, the remainder being one or more ethylenically unsaturated, non-halogenated co-monomers, for example a maleate, an acrylate, a methyacrylate or ethylene. The maleates, acrylates and methacrylates may be the alkyl esters for instance the methyl esters. An example of the vinyl acetate polymer is the one sold under Trade Mark "Vinamul 9800".

The present invention also provides a method for producing a plasticised vinyl acetate polymer or copolymer by adding the plasticiser to an emulsion of the polymer while stirring.

The plasticiser is conveniently added to the emulsion of the polymer and the mixture stirred vigorously using a Silverson homogeniser to obtain a free flowing dispersion.

Vinyl acetate polymers plasticised with the polyesters hereinbefore described may be used in surface coatings, fusible interlinings, adhesives, binders for fibres and non-woven fabrics, sizes for glass fibres, barrier coatings for bitumen-containing floor coverings, linoleum and leather finishes.

Vinyl acetate polymers plasticised in accordance with the present invention are superior to those plasticised with di-n-butyl phthalate which is the commonest plasticiser for polyvinyl acetate. For instance, the volatile loss is significantly less and there is an improvement in the solvent extraction resistance. We have found surprisingly that the light transmission of compositions of vinyl acetate polymers or copolymers containing end-stopped polyesters of the present invention is superior to that of vinyl acetate polymers or copolymers containing non-end-stopped polyesters.

The following Examples further illustrate the present invention. Parts by weight shown therein bear the same relation to parts by volume as do kilograms to liters. Parts and percentages are expressed by weight.

EXAMPLE 1

(a) A round bottom 4-neck flask was fitted with a stirrer, nitrogen inlet, thermometer and steam-heated vertical condenser connected to a water-separator and water-cooled condenser. Heat is supplied by an electric heating mantle.

To the flask was charged 592 parts of phthalic anhydride, 382 parts of polyethylene glycol of molecular weight 200, 326 parts of n-butanol, 100 parts of xylene, and 1.3 parts of stannous oxide catalyst. The flask was initially purged with nitrogen and the whole of the subsequent reaction carried out under a slow stream of nitrogen.

The reaction mass was heated up to 200° C. with stirring over 8 hours, and then reacted for a further 8 to 16 hours at approximately 200° C. until the acid value of the reaction mixture was less than 5 milligrams potassium hydroxide per gram. About 72 parts of water formed in the reaction was collected via the water separator.

The apparatus was then modified for distillation under vacuum: the steam-heated condenser was replaced by a still-head carrying a thermometer and connected to a water cooled condenser. The latter was fitted with a vacuum receiver adapter and receiver. The solvent was first removed and the product then heated for a further 4 hours at 5 millimeters of mercury pressure at 160° C. The reaction mass was cooled, 12 parts of active carbon added and the product heated for 2 hours at 90° C. and 20 millimeters of mercury pressure. The material was finally filtered using a Buchner funnel under vacuum. 1127 parts of a clear liquid product was obtained having a molecular weight of 550. The yield was 92% of theory. The acid value was 0.49 milligrams of potassium hydroxide per gram and the hydroxyl value was 7.0 milligrams of potassium hydroxide per gram. The viscosity was 791 centistokes at 25° C.

(b) 33 parts of the polyester prepared in Example 1(a) was added slowly to a mixture of 33 parts water and 100 parts of an emulsion of polyvinyl acetate containing 50 parts of polyvinylacetate. The emulsion was stirred vigorously in a Silverson homogeniser until a free flowing dispersion was obtained, which was cast at a wet film thickness of 0.020 inches onto a clean glass plate. After standing for 24 hours the cast film was assessed visually for clarity and was found to be very good.

EXAMPLES 2 and 3

The polyesters shown in Table 1 were prepared in essentially the same way as in Example 1(a) and were added to polyvinyl acetate as in Example 1(a). The clarity was very good in each case.

TABLE I

| Example | Polyester | Acid Value mg.KOH/g | Hydroxyl Value mg.KOH/g | Molecular Weight | Viscosity Centistokes at 25° C. |
|---|---|---|---|---|---|
| 2 | Phthalic Anhydride (4 moles) Ethylene Glycol (2.1 moles) n-butanol (4.4 moles) | 0.35 | 15 | 350 | 647 |
| 3 | Phthalic Anhydride (4 moles) Triethylene Glycol (2.1 moles) n-butanol (4.4 moles) | 0.5 | negligible | 580 | 1015 |

Comparative Example

The film clarity/compatibility of polyvinyl acetate containing a polyester prepared as in Example 1(a) was compared with that of polyvinyl acetate containing a commercially available plasticiser based on adipic acid and polyethylene glycol having a molecular weight of 200, but not end-stopped with an aliphatic alcohol (Polyester A). Both emulsions and films were prepared as in Example 1(b) and the clarity of the films measured as a percentage of light transmission was as follows:

| PLASTICISER | CLARITY % LIGHT TRANSMISSION |
|---|---|
| Polyester of Example 1 | 81 |
| Polyester A | 62 |

Polyester A produced a film of poorer clarity indicating less compatibility with polyvinyl acetate than the polyester prepared as in Example 1(a) of the present invention.

We claim:

1. A composition consisting essentially of a vinyl acetate polymer selected from the group consisting of homopolymers of vinyl acetate and copolymers of vinyl acetate with one or more ethylenically unsaturated non-halogenated comonomers wherein the proportion of vinyl acetate in the copolymer is 55-100%, and from 10 to 100% by weight based on the weight of the polymer of a polyester having a molecular weight of 350 to 1500 derived from the reaction of a phthalic acid or anhydride or a mixture thereof with a polyethylene glycol having a molecular weight of 175 to 225, and an aliphatic alcohol containing from 3 to 6 carbon atoms; the phthalic acid or anhydride or mixture thereof being reacted with theoretical amounts of alcohol and glycol needed to effect the reaction with the proviso that the alcohol may be reacted in amounts ranging from 0–50% below the amounts necessary to effect the reaction up to 20 mol% in excess of the amount needed to produce the final product and the glycol may be reacted with the phthalic acid or phthalic acid anhydride or mixture thereof in amounts ranging from 0–10 mol % below the theoretical amount necessary to effect the reaction up to 20 mol % in excess of the theoretical amount.

2. A composition according to claim 1 in which the polyester has a molecular weight from 350 to 900.

3. A composition according to claim 1, wherein the vinyl acetate polymer is a homopolymer of vinyl acetate.

4. A composition according to claim 1 in which the alcohol from which the polyester is derived is n-butyl alcohol or iso-butyl alcohol.

5. A composition according to claim 1 in which the polyester is derived from 4 moles phthalic anhydride, 4.4 moles of n-butanol and 2.1 moles of polyethylene glycol having a molecular weight of 200.

6. A composition according to claim 1 in which the amount of polyester is from 40 to 80% by weight based on the weight of vinyl acetate polymer.

* * * * *